United States Patent
Kuwahara

(10) Patent No.: US 12,522,650 B2
(45) Date of Patent: Jan. 13, 2026

(54) ANTI-RS VIRUS-RECOGNIZING ANTIBODY, AND IMMUNOASSAY METHOD AND IMMUNOASSAY APPARATUS USING THE ANTIBODY

(71) Applicant: Denka Company Limited, Tokyo (JP)

(72) Inventor: Miwa Kuwahara, Niigata (JP)

(73) Assignee: Denka Company Limited, Tokyo (JP)

( * ) Notice: Subject to any disclaimer, the term of this patent is extended or adjusted under 35 U.S.C. 154(b) by 918 days.

(21) Appl. No.: 17/776,204

(22) PCT Filed: Nov. 11, 2020

(86) PCT No.: PCT/JP2020/042064
§ 371 (c)(1),
(2) Date: May 11, 2022

(87) PCT Pub. No.: WO2021/095763
PCT Pub. Date: May 20, 2021

(65) Prior Publication Data
US 2023/0002479 A1 Jan. 5, 2023

(30) Foreign Application Priority Data
Nov. 12, 2019 (JP) ................. 2019-204630

(51) Int. Cl.
*C07K 16/00* (2006.01)
*C07K 16/10* (2006.01)
*G01N 33/543* (2006.01)
*G01N 33/569* (2006.01)

(52) U.S. Cl.
CPC ....... *C07K 16/1027* (2013.01); *G01N 33/543* (2013.01); *G01N 33/569* (2013.01); *C07K 2317/54* (2013.01); *C07K 2317/55* (2013.01); *C07K 2317/56* (2013.01)

(58) Field of Classification Search
CPC ............ C07K 16/1027; C07K 2317/54; C07K 2317/55; C07K 2317/56; G01N 33/543; G01N 33/569
See application file for complete search history.

(56) References Cited

U.S. PATENT DOCUMENTS

| | | |
|---|---|---|
| 2014/0272931 A1 | 9/2014 | Ziemann et al. |
| 2016/0139125 A1 | 5/2016 | Kosaka et al. |
| 2022/0403010 A1 | 12/2022 | Kuwahara |

FOREIGN PATENT DOCUMENTS

| | | |
|---|---|---|
| CN | 103048459 A | 4/2013 |
| CN | 105753981 A | 7/2016 |
| CN | 109232738 A | 1/2019 |
| EP | 3 556 771 A1 | 10/2019 |
| JP | 6454274 B2 | 1/2019 |
| JP | 2021-073934 A | 5/2021 |
| WO | WO-2014/203988 A1 | 12/2014 |
| WO | WO-2018/136626 A1 | 7/2018 |

OTHER PUBLICATIONS

Collins et al., "Respiratory Syncytial Virus and Metapneumovirus," in Knipe DM et al., Eds., Fields Virology, 6th Ed., Lippincott Williams & Wilkins, Philadelphia, 2013, 1086-1123.
International Search Report dated Jan. 19, 2021 in PCT/JP2020/042064.
Tien et al., "Development of a Rapid Fluorescent Immunochromatographic Test to Detect Respiratory Syncytial Virus," International Journal of Molecular Sciences, Oct. 2, 2018, 10:3013, 1-16.
Chiu et al., "Antibody Structure and Function: The Basis for Engineering Therapeutics," Antibodies, Dec. 3, 2019, 8(55):1-80.
Office Action dated Oct. 5, 2023 in EP 20888667.1.
Supplementary European Search Report dated Jan. 3, 2023, in EP 20888667.1.
Anderson et al., "Antigenic Characterization of Respiratory Syncytial Virus Strains with Monoclonal Antibodies," The Journal of Infectious Diseases, Apr. 1985, 151(4):626-633.
International Search Report dated Jan. 19, 2021 in PCT/JP2020/042063.
Murray et al., "Characterization of Monoclonal Antibodies Raised against Recombinant Respiratory Syncytial Virus Nucleocapsid (N) Protein: Identification of a Region in the Carboxy Terminus of N Involved in the Interaction with P Protein," Virology, Oct. 1, 2001, 289(2):252-261.
Office Action dated Oct. 8, 2024 in JP 2023-187890.
Quidel Corporation, "510(k) Substantial Equivalence Determination Decision Summary," k130398, Sofia RSV FIA test, Feb. 25, 2017, 1-16.
Supplementary European Search Report dated Jun. 2, 2023 in EP 20887732.4.
Final Office Action dated Oct. 31, 2025 in U.S. Appl. No. 17/776,211.

*Primary Examiner* — Lei Yao
(74) *Attorney, Agent, or Firm* — Foley & Lardner LLP

(57) ABSTRACT

Provided are an anti-RS virus antibody with high sensitivity and a test reagent using the antibody.
An anti-RS virus N protein monoclonal antibody, comprising a heavy chain variable region consisting of the amino acid sequence as set forth in SEQ ID NO: 1, and a light chain variable region consisting of the amino acid sequence as set forth in SEQ ID NO: 2, 3 or 4, or an antigen-binding fragment thereof.

6 Claims, No Drawings
Specification includes a Sequence Listing.

SEQUENCE LISTING

```
<160> NUMBER OF SEQ ID NOS: 4

<210> SEQ ID NO 1
<211> LENGTH: 98
<212> TYPE: PRT
<213> ORGANISM: Artificial
<220> FEATURE:
<223> OTHER INFORMATION: Synthetic

<400> SEQUENCE: 1

Asp Val Gln Leu Gln Glu Ser Gly Pro Gly Leu Val Lys Pro Ser Gln
1               5                   10                  15

Ser Leu Ser Leu Thr Cys Ser Val Thr Gly Tyr Ser Ile Thr Ser Gly
            20                  25                  30

Tyr Tyr Trp Asn Trp Ile Arg Gln Phe Pro Gly Asn Lys Leu Glu Trp
        35                  40                  45

Met Gly Tyr Ile Ser Tyr Asp Gly Ser Asn Asn Tyr Asn Pro Ser Leu
    50                  55                  60

Lys Asn Arg Ile Ser Ile Thr Arg Asp Thr Ser Lys Asn Gln Phe Phe
65                  70                  75                  80

Leu Lys Leu Asn Ser Val Thr Thr Glu Asp Thr Ala Thr Tyr Tyr Cys
                85                  90                  95

Ala Arg

<210> SEQ ID NO 2
<211> LENGTH: 95
<212> TYPE: PRT
<213> ORGANISM: Artificial
<220> FEATURE:
<223> OTHER INFORMATION: Synthetic

<400> SEQUENCE: 2

Asp Ile Val Met Thr Gln Ser His Lys Phe Met Ser Thr Ser Val Gly
1               5                   10                  15

Asp Arg Val Ser Ile Thr Cys Lys Ala Ser Gln Asp Val Ser Thr Ala
            20                  25                  30

Val Ala Trp Tyr Gln Gln Lys Pro Gly Gln Ser Pro Lys Leu Leu Ile
        35                  40                  45

Tyr Ser Ala Ser Tyr Arg Tyr Thr Gly Val Pro Asp Arg Phe Thr Gly
    50                  55                  60

Gly Gly Ser Gly Thr Asp Phe Thr Phe Thr Ile Thr Ser Val Gln Ala
65                  70                  75                  80

Glu Asp Leu Ala Val Tyr Tyr Cys Gln Gln His Tyr Ser Ile Phe
                85                  90                  95

<210> SEQ ID NO 3
<211> LENGTH: 98
<212> TYPE: PRT
```

```
<213> ORGANISM: Artificial
<220> FEATURE:
<223> OTHER INFORMATION: Synthetic

<400> SEQUENCE: 3

Asp Ile Val Leu Thr Gln Ser Pro Ala Ser Leu Ala Val Ser Leu Gly
1               5                   10                  15

Gln Arg Ala Thr Ile Ser Tyr Arg Ala Ser Lys Ser Val Ser Thr Ser
                20                  25                  30

Gly Tyr Ser Tyr Met His Trp Asn Gln Gln Lys Pro Gly Gln Pro Pro
            35                  40                  45

Arg Leu Leu Ile Tyr Leu Val Ser Asn Leu Glu Ser Gly Val Pro Ala
    50                  55                  60

Arg Phe Ser Gly Ser Gly Ser Gly Thr Asp Phe Thr Leu Asn Ile His
65                  70                  75                  80

Pro Val Glu Glu Glu Asp Ala Ala Thr Tyr Tyr Cys Gln His Ile Arg
                85                  90                  95

Glu Leu

<210> SEQ ID NO 4
<211> LENGTH: 94
<212> TYPE: PRT
<213> ORGANISM: Artificial
<220> FEATURE:
<223> OTHER INFORMATION: Synthetic

<400> SEQUENCE: 4

Asp Ile Val Met Thr Gln Ser His Lys Phe Met Ser Thr Ser Val Gly
1               5                   10                  15

Asp Arg Val Ser Ile Thr Cys Lys Ala Ser Gln Asp Val Ser Ser Ala
                20                  25                  30

Val Ala Trp Tyr Gln Gln Lys Pro Gly Gln Ser Pro Lys Leu Leu Ile
            35                  40                  45

Tyr Ser Ala Ser Tyr Arg Tyr Thr Gly Val Pro Asp Arg Phe Thr Gly
    50                  55                  60

Ser Gly Ser Gly Thr Asp Phe Thr Phe Thr Ile Ser Ser Val Gln Ala
65                  70                  75                  80

Glu Asp Leu Ala Val Tyr Tyr Cys Gln Gln Tyr Tyr Ser Ile
                85                  90
```

ANTI-RS VIRUS-RECOGNIZING ANTIBODY, AND IMMUNOASSAY METHOD AND IMMUNOASSAY APPARATUS USING THE ANTIBODY

CROSS-REFERENCE TO RELATED APPLICATIONS

This application is the U.S. National Stage of PCT/JP2020/042064, filed Nov. 11, 2020, which claims priority to JP 2019-204630, filed Nov. 12, 2019.

The instant application contains a Sequence Listing which has been submitted in ASCII format via EFS-WEB and is hereby incorporated by reference in its entirety. Said ASCII copy, created on May 3, 2022, is named sequence.txt and is 4,010 bytes.

TECHNICAL FIELD

The present invention relates to an immunoassay method and an immunoassay apparatus, which are used in the immunological measurement of an RS virus, and an anti-RS virus antibody used therefor.

BACKGROUND ART

Since a monoclonal antibody recognizes only a specific antigen, the monoclonal antibody is widely used in detection of the specific antigen. In the envelope of an RS virus (respiratory syncytial virus), a G protein as a glycoprotein and an F protein associated with cell fusion are present (Non Patent Literature 1). It has been known that there is a large difference in the amino acid sequence of the G protein between the subtypes (type A and type B) of the RS virus (Non Patent Literature 1). On the other hand, it has been known that there is a small difference in the amino acid sequence of the F protein between the subtypes (type A and type B) of the RS virus, and a major number of RS virus-testing kits have been detection of the F protein. However, it has been extremely difficult to develop an RS virus-testing kit exhibiting a practical positive detection rate, which is capable of detecting clinically isolated strains without omission, only by enhancing the affinity of an antibody for the F protein (Patent Literature 1).

In addition, the N protein of the RS virus is also referred to as a "nucleoprotein," and this N protein consists of 391 amino acid residues. The N protein is a structural component of a ribonucleoprotein complex called a "nucleocapsid," and surrounds the genomic RNA of the RS virus to form a spiral structure. It is known that a difference in the amino acid sequence of the N protein is smallest between the subtypes (type A and type B) of the RS virus. However, it has been extremely difficult to detect clinically isolated strains without omission, only by using the antibody reacting against the N protein. Thus, in order to develop an RS virus-testing kit capable of detecting clinically isolated strains without omission, it has been necessary to mix the antibody reacting against the F protein with the antibody reacting against the N protein (Patent Literature 1).

CITATION LIST

Patent Literature

Patent Literature 1: Japanese Patent No. 6454274

Non Patent Literature

Non Patent Literature 1: Collins P L and Karron R A. Respiratory syncytial virus. In: Knipe D M et al., eds. Fields Virology, 6th ed. Lippincott Williams & Wilkins, Philadelphia: pp. 1086-1123 (2013).

SUMMARY OF INVENTION

Technical Problem

At present, test reagents using various types of anti-RS virus antibodies have been commercially available. However, when the RS virus has been detected using these conventional RS virus test reagents, the sensitivity has not been sufficient.

Under the above-described current circumstances, it is an object of the present invention to provide an anti-RS virus antibody with high sensitivity, and a test reagent using the antibody.

Solution to Problem

The present inventors have found that, in order to efficiently capture an RS virus contained in a specimen at a determination site so as to enhance the sensitivity of an immunochromatography device, an antibody reacting against the N protein (nucleoprotein) of the RS virus is used, so that sensitivity to detect the RS virus can be improved, thereby completing the present invention.

Specifically, the present invention is as follows.

[1] An anti-RS virus N protein monoclonal antibody, comprising a heavy chain variable region consisting of the amino acid sequence as set forth in SEQ ID NO: 1, and a light chain variable region consisting of the amino acid sequence as set forth in SEQ ID NO: 2, 3 or 4, or an antigen-binding fragment thereof.

[2] An anti-RS virus N protein monoclonal antibody, comprising a heavy chain variable region consisting of an amino acid sequence having a sequence identity of 90% or more to the amino acid sequence as set forth in SEQ ID NO: 1 and having a binding activity to the RS virus N protein, and a light chain variable region consisting of an amino acid sequence having a sequence identity of 90% or more to the amino acid sequence as set forth in SEQ ID NO: 2, 3 or 4 and having a binding activity to the RS virus N protein, or an antigen-binding fragment thereof.

[3] The anti-RS virus N protein monoclonal antibody or an antigen-binding fragment thereof, according to the above [1] or [2], wherein the antigen-binding fragment is a peptide fragment selected from the group consisting of Fab, Fab', F(ab')2, a single-chain antibody (scFv), dsFv, a diabody, and a minibody.

[4] An RS virus detection reagent, comprising the monoclonal antibody according to any one of the above [1] to [3] or an antigen-binding fragment thereof.

[5] The RS virus detection reagent according to the above [4], which is an immunochromatography reagent.

[6] An RS virus detection kit, comprising the monoclonal antibody according to any one of the above [1] to [3] or an antigen-binding fragment thereof.

[7] A method for detecting an RS virus, using the monoclonal antibody according to any one of the above [1] to [3] or an antigen-binding fragment thereof, according to an immunological detection method.

[8] The method according to the above [7], which is immunochromatography.

The present description includes the contents as disclosed in Japanese Patent Application No. 2019-204630, which is a priority document of the present application.

Advantageous Effects of Invention

According to the method of the present invention, since an anti-RS virus N protein antibody is used in immunoassay, high sensitivity can be obtained. In addition, according to the present invention, an immunoassay apparatus and a monoclonal antibody, which are used in a novel detection method of the present invention, are provided.

DESCRIPTION OF EMBODIMENTS

The test subject detected by the method of the present invention is an RS virus, and a monoclonal antibody that recognizes an N protein as an antigen is used.

According to the method of the present invention, an immunoassay is carried out using a monoclonal antibody that recognizes an N protein as an antigen, or an antigen-binding fragment thereof. Herein, the term "to recognize" means to specifically react, namely, to perform an antigen-antibody reaction. The term "specific" means that the aforementioned antibody does not cause an antigen-antibody reaction, at a detectable level, with the protein in a liquid system in which the protein is mixed with the antibody, or that even if the aforementioned antibody causes a certain binding reaction or association reaction, the level of the reaction is clearly weaker than the antigen-antibody reaction of the antibody with the antigen.

An antigen-binding fragment formed by separating only an antigen-binding site from the monoclonal antibody of the present invention can also be used in the method of the present invention. That is to say, when fragments having specific antigen-binding ability (antigen-binding fragments), which are produced by known methods and bind to the N protein of the RS virus, such as Fab, Fab', F(ab')2, a single-chain antibody (scFv), dsFv, a diabody, and a minibody, are used, these fragments are encompassed in the present monoclonal antibody and are included in the scope of the present invention. In addition, the class of the monoclonal antibody is not limited to IgG, and may also be IgM or IgY.

The monoclonal antibody used in the method of the present invention can be obtained by immunizing an animal to be immunized with a complex or extract containing an antigen of interest, or an antigen or a partial peptide thereof according to a known immunological method, and then producing hybridomas using the cells of the immunized animal. The length of the peptide used in immunization is not particularly limited, and a peptide consisting of preferably 5 or more amino acids, and more preferably 10 or more amino acids can be used as an immunogen. Such an immunogen can be obtained from a culture solution, but it can also be obtained by incorporating DNA encoding any given antigen into a plasmid vector and then introducing the vector into host cells, so that it can be expressed therein. Any given antigen used as an immunogen or a partial peptide thereof is expressed as a fusion protein that is fused with any of the below-exemplified proteins, and it can be used as an immunogen, after purification or in an unpurified state. For the production of fusion proteins, there can be utilized glutathione S-transferase (GST), maltose-binding protein (MBP), thioredoxin (TRX), Nus tag, S tag, HSV tag, FRAG tag, polyhistidine tag, etc., which are commonly used as "protein expression/purification tags" by those skilled in the art. The fusion protein fused with any of these proteins is preferably used as an immunogen, after any given antigen or a partial peptide portion thereof has been separated from other tag portions by using a digestive enzyme, and has been then purified.

A monoclonal antibody can be easily prepared from an immunized animal according to a publicly-known method of Kohler et al. (Kohler et al., Nature, vol. 256, pp. 495-497 (1975)). Specifically, antibody-producing cells such as spleen cells or lymphocytes are recovered from an immunized animal, and the recovered cells are then fused with mouse myeloma cells according to an ordinary method to produce hybridomas. The obtained hybridomas are cloned by a limiting dilution method, etc., and thereafter, among monoclonal antibodies produced from the cloned hybridomas, a monoclonal antibody having an antigen-antibody reaction with an antigen used in the immunization of the animal is selected.

A monoclonal antibody can be purified from an ascitic fluid or a culture supernatant according to a known immunoglobulin purification method. Examples of the known immunoglobulin purification method may include a fractionation method according to salting-out using ammonium sulfate or sodium sulfate, a PEG fractionation method, an ethanol fractionation method, a DEAE ion exchange chromatography method, and a gel filtration method. Moreover, the monoclonal antibody can also be purified by an affinity chromatography method using a carrier binding to any of Protein A, Protein G, and Protein L, depending on the species of the immunized animal and the class of the monoclonal antibody.

The amino acid sequence of the heavy chain variable region of the antibody recognizing the N protein of an RS virus of the present invention consists of the amino acid sequence as set forth in SEQ ID NO: 1. On the other hand, the amino acid sequence of the light chain variable region of the antibody recognizing the N protein of an RS virus of the present invention consists of the amino acid sequence as set forth in SEQ ID NO: 2, 3 or 4.

The heavy chain variable region does not only include the heavy chain variable region consisting of the amino acid sequence as set forth in SEQ ID NO: 1, but also includes a heavy chain variable region that consists of a protein consisting of an amino acid sequence comprising a deletion, substitution, or addition of one or several amino acids, for example, 1 to 10, preferably 1 to 5, more preferably 1 or 2, and further preferably 1 amino acid, with respect to the aforementioned amino acid sequence, and having the activity of the heavy chain variable region of the antibody, namely, a binding activity to the N protein of an RS virus. The light chain variable region does not only include the light chain variable region consisting of the amino acid sequence as set forth in SEQ ID NO: 2, 3 or 4, but also includes a light chain variable region that consists of a protein consisting of an amino acid sequence comprising a deletion, substitution, or addition of one or several amino acids, for example, 1 to 10, preferably 1 to 5, more preferably 1 or 2, and further preferably 1 amino acid, with respect to the aforementioned amino acid sequence, and having the activity of the light chain variable region of the antibody, namely, a binding activity to the N protein of an RS virus.

Such an amino acid sequence comprising a deletion, substitution, or addition of one or several amino acids with respect to the amino acid sequence as set forth in SEQ ID NO: 2, 3 or 4 may be, for example, an amino acid sequence having a sequence identity of at least 85% or more, preferably 90% or more, more preferably 95% or more, and particularly preferably 97% or more, to the amino acid sequence as set forth in SEQ ID NO: 2, 3 or 4, when the sequence identity is calculated using BLAST (Basic Local Alignment Search Tool at the National Center for Biological Information), etc. (for example, using a default setting parameter, namely, an initial setting parameter).

Such a protein having an amino acid sequence comprising a deletion, substitution, or addition of one or several amino acids with respect to the amino acid sequence as set forth in SEQ ID NO: 2, 3 or 4 is substantially identical to the protein having the amino acid sequence as set forth in SEQ ID NO: 2, 3 or 4.

The antibody recognizing the N protein of an RS virus of the present invention is composed of the above-described heavy chain variable region and a heavy chain constant region, and the above-described light chain variable region and a light chain constant region. The heavy chain constant region is composed of three domains $C_H1$, $C_H2$ and $C_H3$. The heavy chain constant region is an IgG1, IgG2, IgG3, IgG4, IgA, IgE, IgM, or IgD constant region. On the other hand, the light chain constant region is composed of one domain $C_L$. The light chain constant region is a κ or λ constant region.

The antibody recognizing the N protein of an RS virus of the present invention can be produced by inserting DNA encoding the above-described heavy chain and DNA encoding the above-described light chain into an expression vector, then transforming host cells with the vector, and then culturing the host cells. The DNAs encoding the heavy chain variable region and the light chain variable region can be found from the amino acid sequence as set forth in SEQ ID NO: 1.

According to the immunoassay method of the present invention, a measurement is carried out by an immunoassay that utilizes the antigen-antibody reaction of the monoclonal antibody produced as described above or an antigen-binding fragment thereof (hereinafter, in the description until before Examples, the term "antibody" means "an antibody or an antigen-binding fragment thereof," except for the case where it is clearly not the case from the context) with an antigen contained in a specimen. As an immunoassay method applied in the measurement, any of methods publicly known to those skilled in the art, such as a competitive method, an agglutination method, a Western blot method, an immunostaining method, and a sandwich method, can be applied. Besides, in the present invention, the term "measurement" includes any of quantification, semi-quantification, and detection.

The immunoassay is preferably a sandwich method. In the sandwich method, an antigen is sandwiched between two antibodies to form a complex, and the formed complex is detected. The sandwich method itself is publicly known in the field of immunoassay, and this method can be performed, for example, according to an immunochromatography method or an ELISA method. Both of these sandwich methods are publicly known, and the method of the present invention can be carried out according to such a publicly known sandwich method, except for the use of the above-described monoclonal antibody that recognizes the N protein as an antigen.

In the sandwich method, one, or two or more types of antibodies that recognize an antigen (an antibody to be immobilized on a solid phase and a labeled antibody) are used. In the case of using two or more types of antibodies, at least any one of these two types of antibodies is the above-described monoclonal antibody that recognizes the N protein as an antigen. Otherwise, an antigen may be sandwiched between two antibodies of the same type to form a complex.

In an immunoassay involving a sandwich method as a detection principle, as a solid phase on which the antibody is immobilized, all of those capable of immobilizing the antibody thereon according to a known technique can be used. For example, a known solid phase, such as a porous thin membrane (membrane) having capillary action, a particulate substance, a test tube, or a resin flat plate, can be arbitrarily selected. In addition, as a substance that labels the antibody, an enzyme, a radioisotope, a fluorescent substance, a luminescent substance, a colored particle, a colloidal particle, etc. can be used. From the viewpoint of, in particular, the simplicity and rapidity of a clinical test, among the aforementioned immunoassay methods using various materials, immunochromatography, which is a lateral flow immunoassay method using a membrane, is preferable.

The present invention also provides an immunoassay apparatus capable of performing a lateral flow immunoassay using the monoclonal antibody recognizing the N protein as an antigen. The immunoassay apparatus provided by the present invention consists of: a support having a detection region, on which an antibody for capturing a measurement subject (an antigen) (Antibody 1) is immobilized; a label region having a movable labeled antibody (Antibody 2); a sample pad for adding dropwise a specimen; an absorption band for absorbing the spread specimen solution, and a backing sheet for adhering these members to one another. This is the immunoassay apparatus, in which at least either Antibody 1 or Antibody 2 is the monoclonal antibody recognizing the N protein as an antigen of the present invention. This immunoassay apparatus is also referred to as an "immunochromatography test piece."

The support is a material having an ability to immobilize an antibody for capturing a substance to be detected (an antigen) thereon, and the support also has an ability not to prevent the moving of a liquid in the horizontal direction. Preferably, the support is a porous thin membrane having capillary action, which is capable of transporting a liquid and a component dispersed in the liquid due to absorption. The material used for the support is not particularly limited, and examples of the material of the support may include cellulose, nitrocellulose, cellulose acetate, polyvinylidene difluoride (PVDF), glass fiber, nylon, and polyketone. Among these materials, a thin membrane formed using nitrocellulose is more preferable. A membrane, on which the antibody is immobilized, is referred to as an "antibody-immobilized membrane."

The label region consists of a porous base material comprising a labeled antibody, and as a material used for the base material, commonly used glass fiber, non-woven fabric, etc. can be used. For impregnation with a large amount of labeled antibody, the base material is preferably a pad-shaped material having a thickness of approximately 0.3 mm to 0.6 mm. The porous base material that is impregnated with the labeled antibody and is then dried is also referred to as a "dry pad."

For labeling a labeled antibody, enzymes such as alkaline phosphatase or horseradish peroxidase, metal colloids such as gold colloids, silica particles, cellulose particles, colored polystyrene particles, colored latex particles, etc. are used in many cases. In the case of using metal colloidal particles, or colored particles such as colored polystyrene particles or colored latex particles, since coloration is generated as a result of agglutination of these labeling reagents, this coloration is measured. Particles, on which the antibodies are immobilized, are referred to as "antibody-immobilized particles." The amount of the antibody immobilized is not particularly limited, and it is adequate if the antibody may be present in the label region in an amount of several ng to several tens of µg.

The detection region indicates a partial region of the support, on which an antibody for capturing a substance to be detected (an antigen) is immobilized. In the detection region, at least one region, on which an antibody for capturing an antigen is immobilized, is established. The detection region may be included in the support, and an antibody may be immobilized on the support. The amount of the antibody immobilized is not particularly limited, and it is adequate if the antibody may be immobilized on the detection region in an amount of several ng to several tens of µg.

The sample pad is a site to which a specimen is adding dropwise, and is a porous material. The sample pad is a site located most upstream of the immunoassay apparatus. As a material used for the sample pad, commonly used filter paper, glass fiber, non-woven fabric, etc. can be used. In order to use a large amount of specimen in the immunoassay, the sample pad is preferably a pad-shaped material having a thickness of approximately 0.3 mm to 1 mm. Examples of the specimen may also include a sample or the like that is obtained by allowing the specimen to float in another solution, and a sample prepared using the specimen.

The absorption band is a member for absorbing a component that is supplied to the support and is not involved in the reaction in the detection region. As a material used for the absorption band, a water-retentive filter paper, sponge, etc. consisting of a common natural polymer compound or synthetic polymer compound, etc. can be used. In order to promote the developing of the specimen, a material having a high water absorption rate is preferable.

The backing sheet is a member for adhering all of the aforementioned materials, namely, a support, a sample pad, a label region, an absorption band and the like, to one another, with partial overlapping, and for immobilizing them. The backing sheet is not always necessary, if these materials are disposed and immobilized with optimal intervals. However, for the convenience of production or use, it is generally preferable to use the backing sheet.

The immunoassay apparatus of the present invention may further comprise a control display region (a member). The control display region is a site for showing that the test has been accurately carried out. For example, the control display region is located downstream of the detection region, and emits signals such as coloration, when a specimen sample passes through the detection region and reaches the control display region. On the control display region, a substance that binds to an antibody binding to a labeled carrier may be immobilized, or a reagent, such as a pH indicator whose color is changed when the specimen reaches, may be immobilized. When such a labeled carrier-binding antibody is a mouse monoclonal antibody, an anti-mouse IgG antibody may be used.

The size of the immunoassay apparatus is not limited. For example, the present immunoassay apparatus has a vertical length of several cm to some dozen cm, and a horizontal length of several mm to several cm.

The immunoassay apparatus of the present invention may be placed in a containment cassette (vessel). By using this containment cassette, deterioration of the immunoassay apparatus due to, for example, ultraviolet ray or moisture in the air, can be prevented. Moreover, in the case of using a specimen sample having contamination or infectivity, by using the containment cassette, a tester who performs an assay can be prevented from being contaminated or infected.

For example, a resin case having an appropriate size may be used as a containment cassette, and the apparatus of the present invention may be placed in the case. The containment cassette and the immunoassay apparatus placed in the cassette are collectively referred to as an "immunoassay device" in some cases.

An RS virus detection reagent containing the anti-RS virus N protein monoclonal antibody of the present invention comprises the above-described immunoassay apparatus. In addition, an RS virus detection kit containing the anti-RS virus N protein monoclonal antibody of the present invention comprises the above-described immunoassay apparatus. The kit may further comprise a manual, a specimen-collecting device, etc.

According to the method of the present invention, utilizing capillary action, a complex of: Antibody 2, which has been labeled with a suitable labeling substance such as a colored polystyrene particle or a gold colloid (a labeling reagent) capable of binding to a substance to be detected; and the substance to be detected, is developed and moved to a solid-phase support, on which Antibody 1 is immobilized. As a result, a complex consisting of an immobilized substance, a substance to be detected, and a labeling reagent is formed on the solid-phase support, and the signals of the labeling reagent emitted from the complex are then detected (in the case of using a gold colloid, the solid-phase support portion, on which the substance capable of binding to the substance to be detected is immobilized, becomes red), so that the substance to be detected can be detected. This immunoassay method can be carried out at a temperature of 5° C. to 35° C., and preferably at room temperature.

Besides, the number of detection regions and the type of a labeled antibody contained in the label region are not limited to one. Antibodies corresponding to a plurality of measurement subjects are used, so that two or more antigens can be detected using a single immunoassay apparatus.

According to the method of the present invention, whether or not a subject is infected with an RS virus can be detected. When an N protein is detected in the sample of a subject, the subject can be determined to be infected with an RS virus.

When the antibody recognizing an N protein of the present invention is used, an RS virus can be specifically recognized. The antibody recognizing an N protein does not recognize other viruses such as, for example, Adenovirus, Coxsackievirus, Echo virus, Herpes simplex virus, Human Metapneumovirus, Influenza virus, Measles virus, Mumps virus, and Parainfluenza virus, and thus, the antibody recognizing an N protein does not falsely detect these viruses.

Moreover, even clinically isolated strains, which cannot be detected by using the antibody that recognizes the F protein of an RS virus, can be detected by using the antibody recognizing the N protein of an RS virus of the present invention.

Examples of the specimen sample used herein may include specimens such as pharyngeal or nasal cavity swab, pharyngeal or nasal cavity lavage fluid, nasal cavity aspirate fluid, saliva, serum, rectal swab, feces, feces suspension, urine, and cornea swab.

EXAMPLES

Hereinafter, the present invention will be more specifically described based on the following examples. However, the following examples are not intended to limit the scope of the present invention.

Example 1: Production of Anti-RS Virus N Protein Monoclonal Antibody

1. Preparation of RS Virus N Protein Antigen

RS virus-sensitive mammalian cells were infected with the RS virus, and were then cultured for several days. Thereafter, a culture solution of the RS virus-infected cells was inactivated by ultraviolet irradiation, and was then used.

2. Production of RS Virus N Protein Monoclonal Antibody

BALB/c mice were immunized with the RS virus-inactivated antigen prepared in the above 1., and were then bred for a certain period of time. Thereafter, the iliac lymph node was excised from each mouse. According to such "mouse iliac lymph node method" (Sado Y et al., Acta Histochem. Cytochem. 39: 89-94 (2006)), a plurality of hybridoma cell lines producing anti-RS virus N protein antibodies were obtained.

The thus obtained cell line was intraperitoneally administered into a pristane-treated BALB/c mouse, and approximately 2 weeks after the administration, an antibody-containing ascitic fluid was collected. From the obtained ascitic fluid, IgG was purified by an affinity chromatography method using a Protein A column, and a plurality of purified anti-RS virus N protein monoclonal antibodies (hereinafter referred to as "anti-N protein antibodies" at times) were obtained.

In the following examples, taking into consideration reactivity and specificity, antibodies were selected from the obtained plurality of anti-RS virus N protein monoclonal antibodies, and were then used.

Example 2: Immunoassay Apparatus for Measuring RS Virus

1. Immobilization of Anti-RS Virus N Protein Antibody on Nitrocellulose Membrane A solution prepared by diluting the anti-N protein antibody produced in Example 1 with a buffer solution, and an anti-mouse IgG antibody were prepared. Thereafter, the anti-N protein antibody was linearly applied onto the sample pad side of a nitrocellulose membrane backed with a PET film, and the anti-mouse IgG antibody was linearly applied onto the absorbent side thereof. Thereafter, the nitrocellulose membrane was fully dried with warm air, so as to obtain an anti-N protein antibody-immobilized membrane.

2. Immobilization of Anti-RS Virus N Protein Antibody on Colored Polystyrene Particles The anti-N protein antibody produced in Example 1 was covalently bound to colored polystyrene particles, and the resultant was suspended in a floating liquid and was fully dispersed therein by an ultrasonic treatment, so as to obtain anti-N protein antibody-binding colored polystyrene particles. In the present description, the anti-N protein antibody-binding colored polystyrene particles are referred to as "anti-N protein antibody-immobilized particles."

3. Application of Anti-RS Virus N Protein Antibody-Binding Colored Polystyrene Particles and Drying Thereof The antibody-immobilized particles produced in the above 2. were applied in a predetermined amount onto a glass fiber non-woven fabric, and were then fully dried with warm air. In the present description, the thus obtained product is referred to as a "labeling pad."

4. Production of RS Virus-Testing Device

The antibody-immobilized membrane produced in the above 1., the labeling pad produced in the above 2. and 3., and other members (a backing sheet, an absorption band, and a sample pad) were adhered to one another, and the obtained product was then cut to a width of 5 mm, thereby obtaining an RS virus-testing device.

5. Confirmation of Specificity and Accuracy of RS Virus-Testing Device

A specimen suspended solution (50 μL) comprising a virus causing respiratory tract infection (10 mM Tris (pH 8.0), 1% (w/v) polyoxyethylene octyl phenyl ether, 3% (w/v) arginine, and 3% (w/v) BSA) was added dropwise onto the RS virus-testing device produced in the above 4., and was then left at rest for 5 minutes.

When coloration could be confirmed by visual observation at the positions, onto which both the anti-mouse IgG antibody and the anti-N protein antibody had been applied, it was determined to be "+". When coloration could be confirmed by visual observation only at the position, onto which the anti-mouse IgG antibody had been applied, but the coloration could not be confirmed at the position, onto which the anti-N protein antibody had been applied, it was determined to be "−". Moreover, when coloration could not be confirmed by visual observation at the position, onto which the anti-mouse IgG antibody had been applied, it was determined to be invalid.

The results are shown in Table 1.

TABLE 1

| Virus name | Measurement results |
| --- | --- |
| RS virus Long strain (type A) | + |
| RS virus A-2 strain (type A) | + |
| RS virus CH-18 strain (type B) | + |
| Adenovirus type 1 | − |
| Adenovirus type 2 | − |
| Adenovirus type 3 | − |
| Adenovirus type 4 | − |
| Adenovirus type 5 | − |
| Adenovirus type 7 | − |
| Adenovirus type 19 | − |
| Coxsackievirus type A9 | − |
| Coxsackievirus type B4 | − |
| Coxsackievirus type B5 | − |
| Coxsackievirus type B6 | − |
| Echo virus type 2 | − |
| Echo virus type 3 | − |
| Echo virus type 4 | − |
| Echo virus type 6 | − |
| Echo virus type 9 | − |
| Echo virus type 11 | − |
| Echo virus type 30 | − |
| Herpes simplex virus type 1 | − |
| Human Metapneumovirus type A | − |
| Human Metapneumovirus type B | − |
| Influenza virus A/New Caledonia/20/99 (H1N1) | − |
| Influenza virus A/Beijing/262/95 (H1N1) | − |
| Influenza virus A/New York/55/2004 (H3N2) | − |
| Influenza virus A/Hiroshima/52/2005 (H3N2) | − |
| Influenza virus B/Shanghai/361/2002 (Yamagata) | − |
| Influenza virus B/Malaysia/2506/2004 (Victoria) | − |
| Measles virus | − |
| Mumps virus | − |
| Parainfluenza virus type 1 | − |
| Parainfluenza virus type 2 | − |
| Parainfluenza virus type 3 | − |
| Parainfluenza virus type 4 | − |

As shown in Table 1, the immunoassay apparatus using the anti-RS virus N protein antibody of the present invention reacts with the RS virus, but does not exhibit cross-reactivity with other respiratory tract infection-causing viruses. Accordingly, it could be confirmed that the anti-RS virus N protein antibody of the present invention specifically reacts with the RS virus.

Example 3: Analysis of Variable Regions of Anti-RS Virus N Protein Monoclonal Antibody 1. Analysis of Nucleotide Sequences of Variable Regions of Anti-N Protein Antibody A hybridoma cell line producing the anti-N protein antibody produced in Example 1 was sent to Takara Bio, Inc., and Takara Bio, Inc. was asked to analyze the nucleotide sequences of the variable regions of the anti-N protein antibody. RNA was extracted from the hybridoma cell line at Takara Bio, Inc., and nucleotide sequences were then obtained from amplified products of the anti-N protein antibody variable regions obtained by 5'-RACE PCR.

2. Prediction of Amino Acid Sequences of Variable Regions of Anti-N Protein Antibody From the nucleotide sequence information obtained in the above 1., the amino acid sequences of the variable regions were predicted, using IMGT/V-QUEST as a nucleotide sequence analyzing tool of IMGT (registered trademark) database. The results are shown in Table 2.

TABLE 2

| | |
|---|---|
| Heavy chain variable region | DVQLQESGPGLVKPSQSLSLTCSVTGYSITSGYYWNWIRQFPGNKL EWMGYISYDGSNNYNPSLKNRISITRDTSKNQFFLKLNSVTTEDTA TYYCAR (SEQ ID NO: 1) |
| Light chain variable region | DIVMTQSHKFMSTSVGDRVSITCKASQDVSTAVAWYQQKPGQSPKL LIYSASYRYTGVPDRFTGGGSGTDFTFTITSVQAEDLAVYYCQQHY SIF (SEQ ID NO: 2) |
| | DIVLTQSPASLAVSLGQRATISYRASKSVSTSGYSYMHWNQQKPGQ PPRLLIYLVSNLESGVPARFSGSGSGTDFTLNIHPVEEEDAATYYC QHIREL (SEQ ID NO: 3) |
| | DIVMTQSHKFMSTSVGDRVSITCKASQDVSSAVAWYQQKPGQSPKL LIYSASYRYTGVPDRFTGSGSGTDFTFTISSVQAEDLAVYYCQQYY SI (SEQ ID NO: 4) |

Example 4: Comparison Regarding Sensitivity of Anti-RS Virus N Protein Antibody An antigen detection reagent using the anti-N protein antibody of the present invention was compared with an antigen detection reagent using a commercially available anti-F protein antibody, in terms of detection sensitivity to three RS virus strains, which had been isolated from clinical specimens and had been then cultured.

Three RS virus strains isolated from clinical specimens collected in 2016 were each inoculated into Vero cells and were then allowed to proliferate. A 2-fold dilution series of a culture supernatant of the RS virus-infected cells was prepared using a buffer solution, and a predetermined amount thereof was added to a specimen-floating liquid, so as to prepare a sample.

The results are shown in Table 3.

TABLE 3

| | Virus concentration ($TCID_{50}$/mL) | | | | | |
|---|---|---|---|---|---|---|
| Clinically isolated strain 1 | $5.6 \times 10^5$ | $2.8 \times 10^5$ | $1.4 \times 10^5$ | $7.0 \times 10^4$ | $3.5 \times 10^4$ | $1.8 \times 10^4$ |
| Anti-N protein antibody | + | + | + | + | + | − |
| Anti-F protein antibody | + | + | + | + | − | − |
| | Virus concentration ($TCID_{50}$/mL) | | | | | |
| Clinically isolated strain 2 | $6.3 \times 10^6$ | $3.2 \times 10^6$ | $1.6 \times 10^6$ | $7.9 \times 10^5$ | $4.0 \times 10^5$ | $2.0 \times 10^5$ |
| Anti-N protein antibody | + | + | + | + | + | − |
| Anti-F protein antibody | + | + | + | + | + | − |
| | Virus concentration ($TCID_{50}$/mL) | | | | | |
| Clinically isolated strain 3 | $5.6 \times 10^4$ | $5.6 \times 10^3$ | $2.8 \times 10^3$ | $1.4 \times 10^3$ | $7.0 \times 10^2$ | $3.5 \times 10^2$ |
| Anti-N protein antibody | + | + | + | + | + | − |
| Anti-F protein antibody | − | − | − | − | − | − |

A sensitivity comparison test was carried out using the 3 virus strains isolated from the clinical specimens. As a result, to two out of the three strains, the antigen detection reagent using the anti-N protein antibody exhibited sensitivity that was equivalent to or greater than that of the antigen detection reagent using the anti-F protein antibody.

With regard to the remaining one of the three strains, the antigen detection reagent using the anti-F protein antibody did not react at all, but the antigen detection reagent using the anti-N protein antibody exhibited high detection sensitivity.

INDUSTRIAL APPLICABILITY

Using the antibody of the present invention, RS virus infection can be specifically detected.

Sequence Listing Free Text

SEQ ID NOs: 1 to 4 Synthesized

All publications, patents and patent applications cited in the present description are incorporated herein by reference in their entirety.

The invention claimed is:

1. An anti-RS virus N protein monoclonal antibody or an antigen-binding fragment thereof, wherein the antibody or the antigen-binding fragment thereof comprises a heavy chain variable region consisting of the amino acid sequence as set forth in SEQ ID NO: 1, and a light chain variable region consisting of the amino acid sequence as set forth in SEQ ID NO: 2, 3, or 4.

2. A kit for detecting RS virus, comprising the antibody or antigen-binding fragment thereof according to claim 1.

3. The kit according to claim 2, further comprising an immunochromatography test piece, wherein the immunochromatography test piece comprises a support having (1) a detection region on which a first antibody is immobilized;
(2) a label region comprising a second antibody, wherein the second antibody is a movable labeled antibody;
(3) a sample pad to which a specimen sample can be added;
(4) an absorption band capable of absorbing the spread specimen sample; and
(5) a backing sheet, wherein the backing sheet adheres the detection region, the label region, the sample pad, and the absorption band to one another, wherein at least one of the first antibody and the second antibody is the antibody or antigen-binding fragment thereof according to claim 1.

4. A method for detecting an RS virus in a specimen sample, comprising contacting the specimen sample with the antibody or antigen-binding fragment thereof according to claim 1, wherein the antibody or antigen-binding fragment thereof forms a complex with an RS virus N protein antigen, and detecting the formed complex.

5. The method according to claim 4, wherein the method comprises immunochromatography.

6. The antibody or the antigen-binding fragment thereof according to claim 1, wherein the antigen-binding fragment thereof is selected from the group consisting of a Fab, a Fab', a F(ab')2, a single-chain antibody (scFv), a dsFv, a diabody, and a minibody.

* * * * *